United States Patent
Chen (10) Patent No.: US 11,314,526 B2
(45) Date of Patent: Apr. 26, 2022

(54) APPLICATION PREDICTION METHOD, APPLICATION PRELOADING METHOD, AND APPLICATION PRELOADING APPARATUS BASED ON APPLICATION USAGE TIMING

(71) Applicant: GUANGDONG OPPO MOBILE TELECOMMUNICATIONS CORP., LTD., Guangdong (CN)

(72) Inventor: Yan Chen, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 912 days.

(21) Appl. No.: 16/114,559

(22) Filed: Aug. 28, 2018

(65) Prior Publication Data
US 2019/0138325 A1 May 9, 2019

(30) Foreign Application Priority Data
Nov. 8, 2017 (CN) .......................... 201711091993.8

(51) Int. Cl.
*G06F 9/445* (2018.01)
*G06F 11/34* (2006.01)
(Continued)

(52) U.S. Cl.
CPC ............ *G06F 9/4451* (2013.01); *G06F 9/445* (2013.01); *G06F 9/4843* (2013.01);
(Continued)

(58) Field of Classification Search
None
See application file for complete search history.

(56) References Cited

U.S. PATENT DOCUMENTS 5,317,675 A * 5/1994 Ikehara ................ G06K 9/6274
706/25
8,176,437 B1 * 5/2012 Taubman ............ G06F 9/44578
715/810
(Continued)

FOREIGN PATENT DOCUMENTS

CN 104102773 A 10/2014
CN 104951340 A 9/2015
(Continued)

OTHER PUBLICATIONS

The First Office Action of the Priority Application No. 201711091993. 8, dated Jun. 3, 2020.
(Continued)

*Primary Examiner* — Qing Chen (57) ABSTRACT

Provided are an application prediction method, an application preloading method and an application preloading apparatus. The application prediction method includes: obtaining a user behavior sample in a preset time period, where the user behavior sample includes an association record of usage timing of at least two applications determined from two or more applications on a terminal including a usage record of the at least two application and a usage timing relationship of the at least two applications; and training a preset prediction model according to the association record of usage timing to generate an application prediction model, thereby may take full advantage of the association record of usage timing of the applications which may truly reflect the user behavior, optimize the application preloading mechanism, improve the accuracy of the prediction of the application to be started effectively, and further reduce power consumption of the terminal system and the memory usage.

15 Claims, 6 Drawing Sheets

(51) Int. Cl.
  *G06N 7/00* (2006.01)
  *G06F 9/48* (2006.01)
(52) U.S. Cl.
  CPC ...... *G06F 11/3419* (2013.01); *G06F 11/3438* (2013.01); *G06F 11/3447* (2013.01); *G06F 11/3452* (2013.01); *G06N 7/00* (2013.01)

(56) References Cited

U.S. PATENT DOCUMENTS

| | | | | |
|---|---|---|---|---|
| 10,261,938 | B1* | 4/2019 | Jenkins | G06F 16/9574 |
| 10,459,887 | B1* | 10/2019 | Dvortsov | G06F 3/0485 |
| 2001/0037399 | A1 | 11/2001 | Eylon et al. | |
| 2004/0030882 | A1* | 2/2004 | Forman | G06F 9/445 |
| | | | | 713/100 |
| 2004/0193813 | A1* | 9/2004 | Nguyen | G06F 9/445 |
| | | | | 711/156 |
| 2012/0324481 | A1* | 12/2012 | Xia | G06F 9/485 |
| | | | | 719/320 |
| 2013/0120294 | A1* | 5/2013 | Sun | G06F 9/451 |
| | | | | 345/173 |
| 2014/0372356 | A1* | 12/2014 | Bilal | G06F 9/44578 |
| | | | | 706/46 |
| 2015/0013013 | A1* | 1/2015 | Li | G06F 21/60 |
| | | | | 726/26 |
| 2015/0373132 | A1* | 12/2015 | Mukherji | H04L 67/10 |
| | | | | 709/203 |
| 2016/0127497 | A1* | 5/2016 | Himmelreich | H04L 67/2847 |
| | | | | 709/217 |
| 2016/0189049 | A1 | 6/2016 | Silvestri et al. | |
| 2016/0357808 | A1 | 12/2016 | Morris et al. | |
| 2018/0113773 | A1* | 4/2018 | Krishnan | G06F 11/008 |

FOREIGN PATENT DOCUMENTS

| | | |
|---|---|---|
| CN | 105069654 A | 11/2015 |
| CN | 105407158 A | 3/2016 |
| CN | 105453042 A | 3/2016 |
| CN | 105939416 A | 9/2016 |
| CN | 106648811 A | 5/2017 |
| CN | 106843961 A | 6/2017 |
| CN | 107249074 A | 10/2017 |
| WO | 2013/184383 A2 | 12/2013 |
| WO | 2015/183515 A1 | 12/2015 |

OTHER PUBLICATIONS

The second Office Action of the Priority Application No. 201711091993.8, dated Dec. 18, 2020.
Renshu, Yang etc. Neural network prediction of coal mine tunnel support parameters based on engineering analogy of the Intelligent Design System and Engineering Application of Coal Mine Roadway Support, published on Dec. 31, 2015.
The third Office Action of the Priority Application No. 201711091993.8, dated Apr. 1, 2021.
The first Office Action of corresponding European application No. 18202281.4, dated Apr. 29, 2021.
The first Office Action of corresponding Indian application No. 201814040673, dated May 31, 2021.
The Notice of Rejection of the Priority Chinese application No. 201711091993.8, dated Jun. 9, 2021.
Extended European Search Report dated Mar. 1, 2019; Appln. No. 18202281.4.
Written Opinion and International Search Report dated Dec. 28, 2018; PCT/CN2018/110532.

* cited by examiner

FIG. 10

APPLICATION PREDICTION METHOD, APPLICATION PRELOADING METHOD, AND APPLICATION PRELOADING APPARATUS BASED ON APPLICATION USAGE TIMING

CROSS-REFERENCE TO RELATED APPLICATIONS

This application claims priority to Chinese Patent Application No. 201711091993.8, filed on Nov. 8, 2017, which is hereby incorporated by reference in its entirety.

TECHNICAL FIELD

Embodiments of the present application relate to the field of machine learning and, in particular, to an application prediction method, an application preloading method and an application preloading apparatus.

BACKGROUND

With the rapid development of the electronic technology and the improvement of the standard of people's everyday life, a terminal, such as smart phone and tablet, has become an indispensable part of people's daily life.

There are various applications (Application Software, APP) installed on the terminal. In order to make the applications run more fluently, the terminal will usually prepare loading resources for some applications in advance, that is, preload some applications in advance.

However, it is not appropriate to preload applications randomly, since if too many resources are preloaded, too much memory will be occupied, and the power consumption will become large, which will seriously affect the fluency of the terminal. Therefore, the optimization of the preloading mechanism and the reducing of the power consumption of the terminal become critical.

SUMMARY

Embodiments of the present application provide an application prediction method, an application preloading method and an application preloading apparatus, which may optimize the application preloading mechanism, and reduce the power consumption of the terminal system.

A first aspect, embodiments of the present application provide an application prediction method, performed by a processor executing instructions stored on a memory, wherein the method includes:

obtaining a user behavior sample in a preset time period, where the user behavior sample includes an association record of usage timing of at least two applications determined from two or more applications on a terminal, where the association record of usage timing includes a usage record of the at least two application and a usage timing relationship of the at least two applications; and training a preset prediction model according to the association record of usage timing to generate an application prediction model.

A second aspect, embodiments of the present application provide an application preloading method, performed by a processor executing instructions stored on a memory, wherein the method includes:

obtaining current usage status of at least two applications on a terminal;

inputting the current usage status of the at least two applications to a pre-trained application prediction model to obtain probabilities to start the at least two applications, where, the pre-trained application prediction model is generated by training from an association record of usage timing; and determining an application to be started according to the probabilities to start the at least two applications, and preloading the application to be started.

A third aspect, embodiments of the present application provide an application prediction apparatus, including:

a user behavior sample obtaining module configured to obtain a user behavior sample in a preset time period, where the user behavior sample includes association record of usage timing of at least two applications determined from two or more applications on a terminal, where the association record of usage timing includes a usage record of the at least two application and a usage timing relationship of the at least two applications; and an application prediction model generating module configured to train a preset prediction model according to the association record of usage timing to generate an application prediction model.

A forth aspect, embodiments of the present application provide an application preloading apparatus, including:

a usage status obtaining module configured to obtain usage current status of at least two applications on a terminal;

a probability value obtaining module configured to input the current usage status of the at least two applications to a pre-trained application prediction model to obtain probabilities to start the at least two applications, where, the application prediction model is generated by training from an association record of usage timing; and an application preloading module configured to determine an application to be started according to the probabilities to start the at least two applications, and preload the application to be started.

A fifth aspect, embodiments of the present application provide a computer readable storage medium with computer programs stored thereon, where the programs, when being executed by a processor, implement the application prediction model establishing method according to the first aspect.

A sixth aspect, embodiments of the present application provide a computer readable storage medium with computer programs stored thereon, where the programs, when being executed by a processor, implement the application preloading method according to the second aspect.

A seventh aspect, embodiments of the present application provide a terminal, including: a memory, a processor and computer programs stored on the memory and may be run in the processor, where the processor, when executing the computer programs, implements the application prediction model establishing method according to the first aspect.

A eighth aspect, embodiments of the present application provide a terminal, including: a memory, a processor and computer programs stored on the memory and may be run in the processor, where the processor, when executing the computer programs, implements the application preloading method according to the second.

The application prediction model establishing and the application preloading schemes provided in the embodiments of the present application, when establishing an application prediction model, first obtain a user behavior sample in a preset time period, where the user behavior sample includes an association record of usage timing of at least two applications determined from two or more applications on a terminal, where the association record of usage timing includes a usage record of the at least two application and a usage timing relationship of the at least two applications, and train a preset prediction model according to the association record of usage timing to generate the application prediction model, and when preloading an application, obtain current usage status of at least two applications on a terminal, and input the current usage status of the at least two applications to a pre-trained application prediction model to obtain probabilities to start the at least two applications, where, the pre-trained application prediction model is generated by training by an association record of usage timing, and finally determine an application to be started according to the probabilities to start the at least two applications, and preload the application to be started. By using the association record of usage timing as the training sample to generate the application prediction model, it not only solves the technical problems of too many resources being preloaded by the applications, too many resources being occupied and power consumption becoming larger, and even the fluency of the terminal being affected, but also improves the accuracy of the prediction of the application to be started effectively, and furthermore, reduces power consumption of the terminal system and the memory usage.

DESCRIPTION OF EMBODIMENTS

The technical solutions of the present invention will be further described below in conjunction with the accompanying drawings through the specific embodiments. It should be understood that the specific embodiments described herein are merely illustrative of the present invention and are not intended to limit the present invention. It should also be noted that, for the convenience of description, only some, but not all, of the structures related to the present invention are shown in the drawings.

Before discussing the exemplary embodiments in more detail, it should be noted that some exemplary embodiments are described as a process or method depicted as a flowchart. Although the flowcharts describe the various steps as a sequential process, many of the steps therein can be implemented in parallel, concurrently, or concurrently. In addition, the order of the steps can be rearranged. The process may be terminated when its operation is completed, but may also have additional steps not included in the drawings. The processing may correspond to methods, functions, procedures, subroutines, subprograms, and the like.

On a terminal device, application preloading is a common and effective method to improve user experience. Some applications are enabled to run fluently by preparing the loading recourses of these applications in advance.

In the prior art, the application preloading is mainly based on a statistical method. For example, there are several applications that may be used frequently by the user, and all of them may be preloaded; or, the applications may be scored and ranked according to the user's usage habit, and the highly ranked applications are preloaded. However, since the above methods ignore the association information between the applications and the time information, the accuracy of the prediction of the preloading applications is insufficient, thus too many resources need to be preloaded, which will affect user's experience. In fact, the use will use only one application at the next instant. Therefore, it is important to accurately predict which application the user will start next time.

Figure 1:
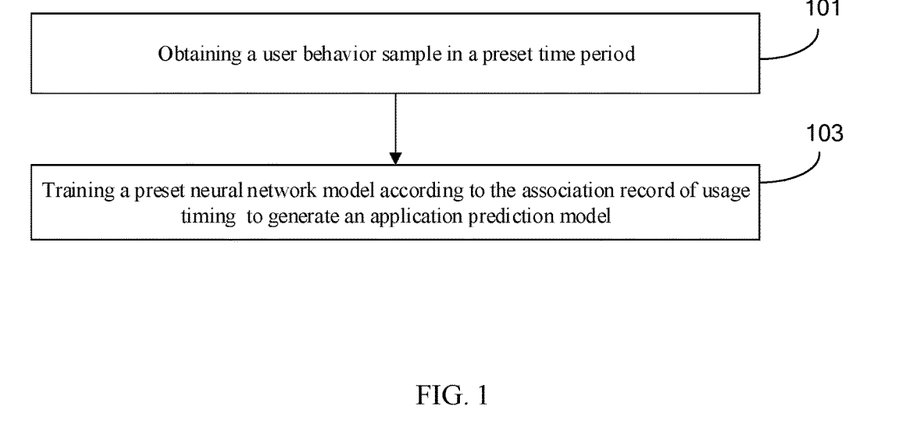
FIG. 1 is a flowchart of an application prediction model establishing method according to an embodiment of the present application.

FIG. 1 is a flowchart of an application prediction model establishing method according to an embodiment of the present application. This method may be implemented by an application prediction model establishing apparatus, where this apparatus may be implemented by software and/or hardware, which may usually be integrated in a terminal. The terminal may be a server, such as a model establishing server used to accomplish an application prediction model establishing function, and may also be a mobile terminal. As shown in FIG. 1, the method may include:

Step 101: obtaining a user behavior sample in a preset time period.

The user behavior sample includes an association record of usage timing of at least two applications determined from two or more applications on the terminal, where the association record of usage timing includes a usage record of the at least two application and a usage timing relationship of the at least two applications.

In an embodiment of the present application, the user behavior sample in the preset time period refers to a history association record of usage timing of using applications on the terminal by a user in the preset time period, for example, the association record of usage timing of using the applications on the terminal by the user in the time period of 8:00-20:00. For example, the user uses the application of Taobao at 8:00, switches from Taobao to the application of Jingdong Mall at 8:30, and switches from Jingdong Mall to the application of Alipay at 9:00. For another example, the user uses the application of Meituan Takeaway at 11:40, and switches from Meituan Takeaway to the application of WeChat at 12:00. The association record of usage timing of the applications not only includes a usage record of the user regarding the applications at each time point, but also includes a usage timing relationship of the user regarding the applications.

Although, various applications are usually installed on the terminal, the number of applications used by the user is limited in a preset period of time, such as one day, and the number of the applications frequently used by the user is also limited. Most of the applications are used less frequently, and can be used once a week or even once a month. If all the applications installed on the terminal are used as the training sample of the application prediction model, not only the amount of data is large, but also the precision of the application prediction model establishment may be affected, affecting the accuracy of the prediction of the application to be started by the user at the next time.

Optionally, the obtaining the user behavior sample in the preset time period includes: sorting the two or more applications according to a usage frequency of the two or more applications in the preset time period; determining at least two target applications according to a sorting result; and determining the association record of usage timing according to usage status of the at least two target applications as the user behavior sample. The advantage of this setting is that, it not only can reduce the data volume of the training sample during the application prediction model establishment dramatically, but also can improve the precision and efficiency of the application prediction model establishment, and furthermore, improve the accuracy of the prediction of the application to be started.

For example, the preset time period is 8:00-22:00, a usage frequency of the user regarding each of the applications on the terminal in this preset time period is counted. Each of the applications is sorted according to the usage frequency, for example, each of the applications is sorted in descending order of the usage frequency. According to the sorting result, the first M target applications are selected, that is, the first M target applications are determined as the applications frequently used by the user, where, M≥2. Furthermore, the association record of usage timing is determined according to usage status of the target applications, where the association record of usage timing records the usage condition of the user regarding the M target applications at each time point in the preset time period, not only includes the usage information of the M target applications and the corresponding instants when they are used, but also includes the usage timing relationship of the M target applications.

In addition, during the process of using the applications on the terminal by the user, a useless application usage record may be generated frequently due to a misoperation of the user. If the user intends to trigger the application of Taobao, but click the application of Compass by mistake, the user may usually quit the application of Compass quickly. Similarly, the useless application usage record may also affect the precision of the application prediction model establishment, and affect the accuracy of the prediction of the application to be started at the next instant.

Optionally, the useless application usage record is filtered out from the history usage record of the applications in the preset time period. For example, if a usage time of a certain application is less than a preset time threshold, the usage record of the application will be filtered out. For example, the usage time of the user regarding the application A is 3s, the preset time threshold is 5s, then the usage record of the application A is filtered out. The advantage of this setting is that, it can improve the precision of the application prediction model establishment effectively, and furthermore, improve the accuracy of the prediction of the application to be started.

It should be noted that, the useless application usage record may be filtered out from the history usage record of the applications first, and then the target applications (the applications frequently used by the user) are determined according to the usage frequency of the applications. Or the target applications (the applications frequently used by the user) may be determined according to the usage frequency of the applications first, and then the useless application usage record is filtered out. The embodiment of the present application does not limit the sequence of filtering out the useless application usage record and determining the target applications according to the usage frequency of the applications.

Optionally, the determining the association record of usage timing according to the usage status of the at least two target applications includes: sampling a usage log of the at least two target applications, in accordance with a preset sampling period, to determine the usage status of the at least two target applications at sampling instants; and associating the usage status of at least two target applications according to the sampling instants and the usage status to determine the association record of usage timing. The advantage of this setting is that, it not only can obtain the association record of usage timing of the applications in the preset time period flexibly, but also can improve the precision of the application prediction model establishment, and furthermore, improve the accuracy of the prediction of the application to be started.

For example, the usage log of the target applications is sampled in accordance with a preset sampling period, for example, the usage log of the target applications in the preset time period is sampled once every three minutes, and a first sampling is conducted from the very beginning of the preset time period. For example, the preset time period is 8:00-12:00, then the first sampling is conducted at 8:00, the second sampling is conducted at 8:03, the third sampling is conducted at 8:06, and so on, until the sampling of the usage log of the target applications in the preset time period is accomplished. Here, the preset sampling period may be set according to the length of the preset time period. For example, if the preset time period is relative long, the preset sampling period may be set to be long adaptively, and when the preset time period is relative short, the preset sampling period may be set to be short adaptively. For another example, the preset sampling period may be set according to the user's requirement adaptively. When the precision of the prediction of the application to be started is required to be high, the preset sampling period may be set to be shorter, and when the precision of the prediction of the application to be started is required to be low, the preset sampling period may be set to be longer. For a further example, the preset sampling period may be set according to the ability of the terminal to process data volume, if the ability of the terminal to process data volume of the training sample during the application prediction model establishment is high, the preset sampling period may be set to be shorter, and when the ability of the terminal to process data volume of the training sample during the application prediction model establishment is low, the preset sampling period may be set to be longer. The present embodiment does not limit the set length and the setting way of the preset sampling period.

In the present embodiment, the usage status of each target application at each sampling instant is determined. It should be noted, at the sampling instant, one and only one target application is used, or no target application is used at the sampling instant, for example the terminal is in the desktop status, or the screen of the terminal is off. The usage status of the at least two target applications are associated according to the sampling instants and the usage status, so as to determine the association record of usage timing. For example, the application A is used at a first sampling instant, the application B is used at a second sampling instant, the screen of the terminal is off at a third sampling instant, denoted as no application being used, and the application C is used at a fourth sampling instant. The usage status of the applications are associated according to the sampling instants and the usage status, so as to determine the association record of usage timing.

Optionally, the association record of usage timing of the applications may be recorded in a form of the sampling instants and identification information of the usage status. For example, M target applications are denoted as 1, 2, . . . , M respectively in a descending order of the usage frequency. If there is no application being used at the sampling instant, denote as M+1. It can be understood that, 1, 2, . . . , M, M+1 are used as identification information of the usage status of the applications. The usage association record of the applications may be recorded through the identification information corresponding to the usage status of the applications corresponding to the sample instants. It should be noted that, the present embodiment does not limit the specific representation way of the association record of usage timing, as long as unique information can be used to represent the usage status of different applications at the sampling instant.

Optionally, the method further includes: grouping the association record of usage timing to obtain a plurality of association record groups of usage timing.

In the embodiment of the present application, the association record of usage timing of the at least two applications in the preset time period is grouped. The association record of usage timing is grouped in accordance with the timing relationship, so as to obtain a plurality of association record groups of usage timing. It can be understood that, the association record of usage timing is grouped in accordance with the timing relationship, so as to obtain a plurality of sub association record of usage timings, that is, the plurality of sub association records usage of timing are the obtained plurality of association record groups of usage timing. In the process of grouping, the preset time period may be equally divided into several sub time periods, and the association record of usage timing is equally divided in accordance with the sub time periods. That is, the obtained plurality of sub association records of usage timing are the association record of usage timing of the applications corresponding to each sub time period. Of course, the preset time period may be divided into several sub time periods which are not exactly the same or totally different, and the association record of usage timing is grouped in accordance with the sub time periods which are not exactly the same or totally different. In the process of grouping, the association record of usage timing may be grouped by means of sliding window. For example, a size fixed sliding window is moved along the association record of usage timing of the applications in the preset time period with equidistant step or non-equidistant step. The association record of usage timing corresponding to respective sliding window is recorded as one association record group of usage timing. For another example, the sliding window is scaled in different sizes, every time the sliding window is moved the size is scaled. The sliding window that is scaled with multiple sizes is moved along the association record of usage timing of the applications in the preset time period with equidistant step or non-equidistant step. The association record of usage timing corresponding to respective sliding window is recorded as one group of association record of usage timing.

Figure 2:
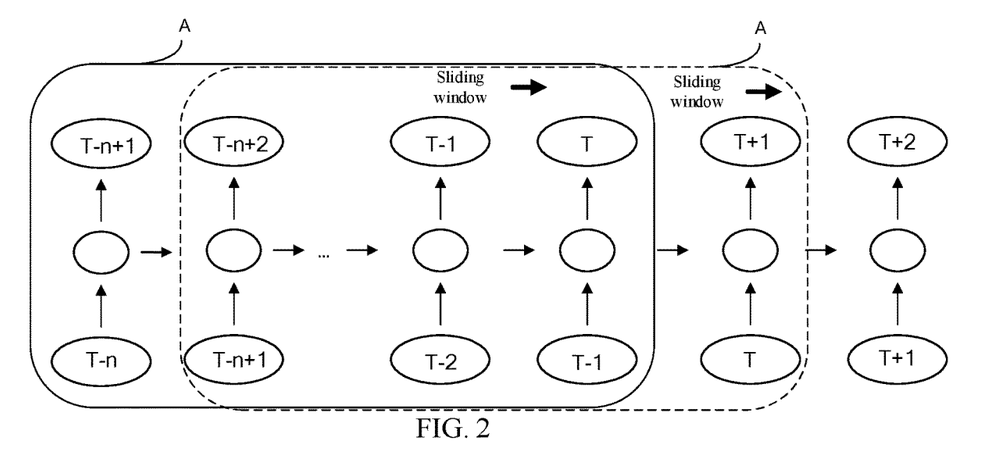
FIG. 2 is a schematic diagram of the process of grouping an association record of usage timing by means of sliding window according to an embodiment of the present application.

Optionally, a usage log of the target applications is sampled in accordance with the preset sampling period, the association record of usage timing determined by the sampling instant and the usage status of the applications corresponding to the sampling instant are grouped, so as to obtain a plurality of association record groups of usage timing. For example, the association record of usage timing of the applications in the preset time period may be grouped according to the timing relationship of the sampling instant and the number of the sampling instant. The sampling instant corresponding to the preset time period may be divided into several sampling instant groups in accordance with the timing relationship. The number of the sampling instant of each sampling instant group may be the same, not exactly the same or totally different. The association records of usage timing corresponding to each sampling instant group are used as the plurality of association record groups of usage timing. In the process of grouping, the association record of usage timing determined by the sampling instant and the usage status corresponding to the sampling instant may also be grouped by means of sliding window. For example, a size fixed sliding window or a sliding window that is scaled with multiple sizes is used to slide along the association record of usage timing with equidistant step or non-quidistant step. The association record of usage timing corresponding to respective sliding window is recoded as one association record group of usage timing. Where, one step can be understood as one sampling instant. For example, FIG. 2 is a schematic diagram of the process of grouping the association record of usage timing Formby means of sliding window according to an embodiment of the present application. As shown in FIG. 2, the size of the sliding window A is fixed, and one step the sliding window A moves is one sampling instant. Where, in FIG. 2, T−n+1, T−n, . . . , T, T+1, T+2 all represent the sampling instant.

Optionally, the association record of usage timing of the at least two target applications corresponding to the first n sampling instants is used as a first association record group of usage timing, the association record of usage timing of the at least two target applications corresponding to the second to the n+1$^{th}$ sampling instants is used as a second association record group of usage timing, and so on, to obtain m−n+1 association record groups of usage timing, where, n is a natural number greater than or equal to 2, and m is a natural number greater than 3. The advantage of this setting is that, a misdetection rate of the usage status of the applications in the association record of usage timing of the applications in the preset time period is extremely low, since it moves along the entire association record of usage timing, and no situation in which application usage status switching of the applications may occur is missed. Precision of the application prediction model establishment may be improved effectively, and the accuracy during application prediction is improved.

For example, the association record of usage timing of the applications corresponding to the first n sampling instants is used as a first association record group of usage timing, the association record of usage timing of the applications corresponding to the second to the n+1$^{th}$ sampling instants is used as the second association record group of usage timing, the association record of usage timing of the applications corresponding to the third to the n+2th sampling instants is used as a third association record group of usage timing, and so on, to obtain m−n+1 association record groups of usage timing. Where, n is a natural number greater than or equal to 3, and m is a natural number greater than 4. For example, n=5, and m=8. That is, there are 8 sampling instants corresponding to the association record of usage timing of the applications in the preset time period, and in accordance with timing relationship, the association record of usage timing corresponding to each 5 sampling instants is used as one association record group of usage timing. It can be understood that, the association record of usage timing corresponding to the first sampling instant to the fifth sampling instant is used as the first association record group of usage timing, the association record of usage timing corresponding to the second sampling instant to the sixth sampling instant is used as the second association record group of usage timing, the association record of usage timing corresponding to the third sampling instant to the seventh sampling instant is used as the third association record group of usage timing, and the association record of usage timing corresponding to the fourth sampling instant to the eighth sampling instant is used as the fourth association record group of usage timing.

Step 102: training a preset prediction model according to the association record of usage timing to generate the application prediction model.

In the embodiment of the present application, the association record of usage timing is used as training samples to train the preset prediction model, such as a neural network model, and generate the application prediction model.

Optionally, the preset prediction model is trained according to the usage status corresponding to the sampling instant in the association record of usage timing. That is, the usage status of the applications corresponding to respective sampling instant in the association record of usage timing is used as the training sample to train the preset prediction model and to generate the application prediction model. The preset prediction model may be a convolutional neural network model, and may also be a recurrent neural network model. The embodiment of the present application does not limit the specific type of the preset prediction model.

Optionally, in the process of training a preset neural network model according to the association record of usage timing to generate the application prediction model, the number of cells on the input layer of the application prediction model is determined according to a vector dimension of the association record of usage timing, and the number of cells on the output layer of the application prediction model is determined according to the number of the at least two target applications. That is, the number of cells on the input layer of the application prediction model may be determined according to the vector dimension of the association record of usage timing, and the number of cells on the output layer may be determined according to the number of the at least two target applications.

For example, the preset neural network model is a recurrent neural network model, where, the recurrent neural network model includes an input layer, a hidden layer and an output layer. The number of cells on the input layer (i.e. the number of neurons on the input layer) may be determined according to the vector dimension of the association record of usage timing. For example, the association record of usage timing includes the usage status of the applications corresponding to n+1 sampling instants. Then the usage status of the applications corresponding to the n+1$^{th}$ instant is predicted according to the usage status of the applications corresponding to the first n instants. For example, the applications used at the first n instants in the association record of usage timing is used as the input to predict the applications to be used at the n+1th instant respectively. That is, the data format of the training sample in the process of generating the application prediction model is [APP$_1$, APP$_2$, . . . , APP$_{n-1}$, APP$_n$]→APP$_{n+1}$. Where, APP$_1$ represents the application used at the first sampling instant, APP$_2$ represents the application used at the second sampling instant, APP$_{n-1}$ represents the application used at the n-1$^{th}$ sampling instant, APP$_n$ represents the application used at the n$^{th}$ sampling instant, and APP$_{n+1}$ represents the application used at the n+1$^{th}$ sampling instant.

For example, the association record of usage timing includes the usage status of the applications corresponding to 6 sampling instants. Then the usage status of the applications corresponding to the sixth instant is predicted using the usage status of the applications corresponding to the previous five instants. For example, the applications used at instant T−4, instant T−3, instant T−2, instant T−1 and instant T in the association record of usage timing is used as the input to predict the application to be used at the instant T+1 respectively. That is, the data format of the training sample in the process of generating the application prediction model is [APP$_{T-4}$, APP$_{T-3}$, APP$_{T-2}$, APP$_{T-1}$, APP$_T$]→APP$_{T+1}$, where, APP$_{T-4}$ represents the application used at sampling instant T−4, APP$_{T-3}$ represents the application used at T−3 sampling instant, APP$_{T-2}$ represents the application used at sampling instant T−2, APP$_{T-1}$ represents the application used at sampling instant T−1, APP$_T$ represents the application used at sampling instant T, and APP$_{T+1}$ represents the application used at sampling instant T+1.

The number of cells on the output layer of the application prediction model may be determined according to the number of the applications. For example, when there are M determined target applications, that is, the application prediction model is established according to the association record of usage timing of the M target applications, and then the number of cells on the output layer of the application prediction model is M+1 (including the situation of no application being used).

Optionally, the hidden layer may includes at least one of an activate function layer, a pooling layer and a normalization layer. An activate function of the activate function layer may be a linear rectifying unit (Relu), and may also be a Softmax function. The embodiment of the present application does not limit the number and the category of the activate function.

Optionally, in the process of training the preset neural network model according to the association record of usage timing to generate the application prediction model, an error function adopted by the application prediction model is a cross entropy loss function:

$$J = \sum_{k=1}^{C} y_k \log(\hat{y}_k);$$

where, $y_k$ represents a standard value of the usage status of the at least two target applications, $\hat{y}_k$ represents a prediction value of the usage status of the at least two target applications, C=M+1, where M represents the number of the at least two target applications, and J represents a cross entropy of the application prediction model. The advantage of this setting is that, it may further optimize a preset neural network parameter, obtain an even better application prediction model, and furthermore, improve the accuracy of the prediction of the application to be started.

In the present embodiment, APP$_{T+1}$ is in the form of one-hot code. That is, the usage status of the application at instant T+1 is exclusive. For example, there are M target applications. For convenience, the M target applications are represented by 1, 2, . . . , M, and M+1 represents that no application is used. If the value of M is 10, at instant T+1, an application of serial number 5 is used, then a predicted coding vector corresponding to the instant T+1 is [0,0,0,0, 1,0,0,0,0,0]. That is, only the location corresponding to the serial number 5 is 1, and others are all 0.

In the process of training using a stochastic gradient descent, the training may be accomplished when a loss value equal to or less than a loss threshold, or the training may be accomplished when there is no changed between the or more continuously obtained loss values. After the training is accomplished, respective parameter in the current application prediction model is obtained, and the respective parameter is stored as an optimizing parameter. When it is needed to predict the application through the application prediction model, the optimizing parameter is used for predicting. Optionally, the stochastic gradient descent may adopt a way of small batching to train and obtain the optimal parameters, for example, the size of a batch is 128.

The application prediction model establishing method provided by the embodiment of the present application, by using the association record of usage timing as the training sample to generate the application prediction model, may take full advantage of the association record of usage timing of the applications which may truly reflect the user behavior, optimize the application preloading mechanism, and improve the accuracy of the prediction of the application to be started effectively.

Figure 3:
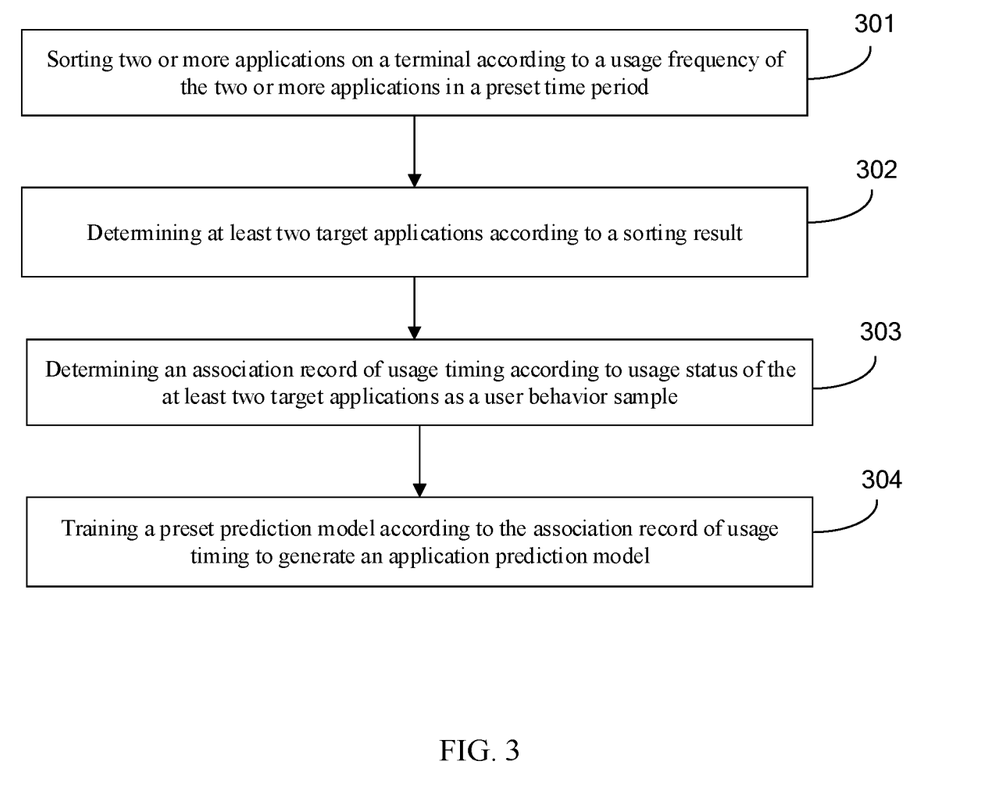
FIG. 3 is a flowchart of another application prediction model establishing method according to an embodiment of the present application.

FIG. 3 is a flowchart of another application prediction model establishing method according to an embodiment of the present application, the method includes:

Step 301: sorting two or more applications on a terminal according to a usage frequency of the two or more applications in a preset time period.

Step 302: determining at least two target applications according to a sorting result.

Step 303: determining an association record of usage timing according to usage status of the at least two target applications as a user behavior sample.

Step 304: training a preset prediction model according to the association record of usage timing to generate an application prediction model.

The application prediction model establishing method provided by the embodiment of the present application not only may take full advantage of the association record of usage timing of the applications which may truly reflect the user behavior and optimize the application preloading mechanism, but also may improve the precision of the application prediction model establishment and furthermore, improve the accuracy of the prediction of the application to be started effectively.

Figure 4:
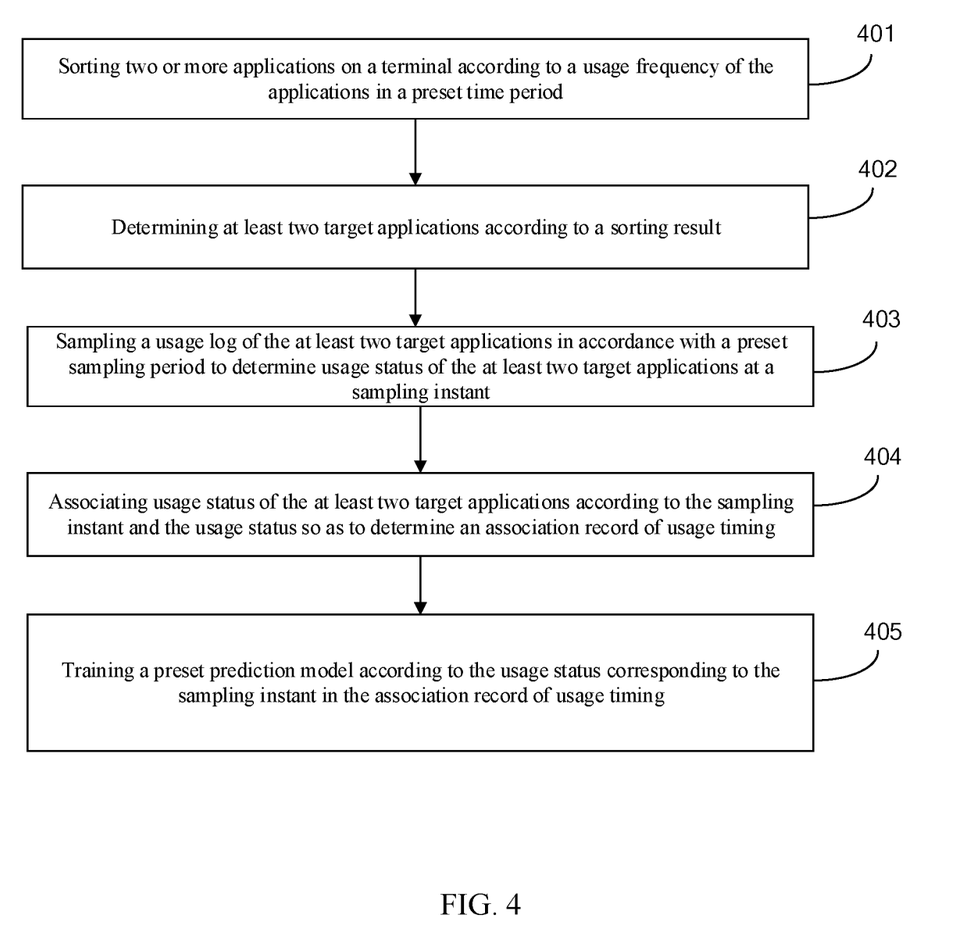
FIG. 4 is a flowchart of still another application prediction model establishing method according to an embodiment of the present application.

FIG. 4 is a flowchart of still another application prediction model establishing method according to an embodiment of the present application, the method includes:

Step 401: sorting two or more applications on a terminal according to a usage frequency of the applications in a preset time period.

Step 402: determining at least two target applications according to a sorting result.

Step 403: sampling a usage log of the at least two target applications in accordance with a preset sampling period to determine usage status of the at least two target applications at a sampling instant.

Step 404: associating usage status of the at least two target applications according to the sampling instant and the usage status so as to determine an association record of usage timing.

Step 405: training a preset prediction model according to the usage status corresponding to the sampling instant in the association record of usage timing.

The application prediction model establishing method provided by the embodiment of the present application not only may obtain the association record of usage timing of the applications in the preset time period flexibly, but also may improve the precision of the application prediction model establishment, and furthermore, improve the accuracy of the prediction of the application to be started.

Figure 5:
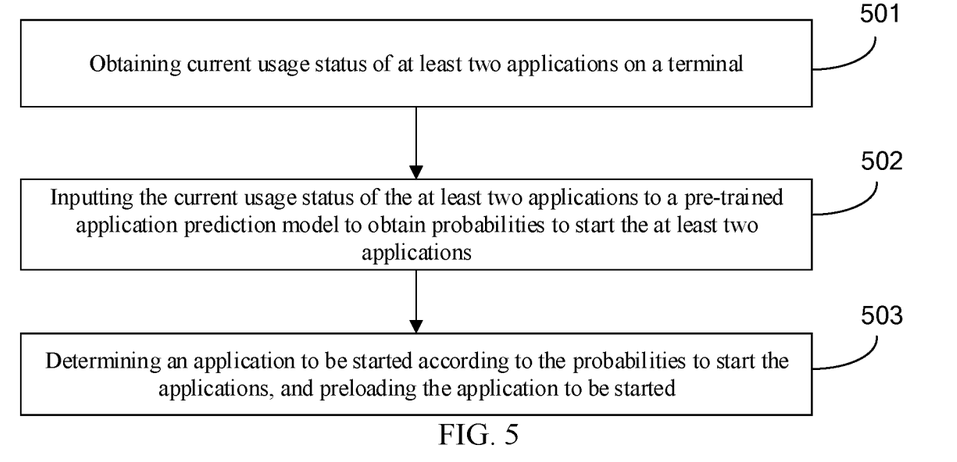
FIG. 5 is a flowchart of an application preloading method according to an embodiment of the present application.

FIG. 5 is a flowchart of an application preloading method according to an embodiment of the present application, and the method may be implemented by an application preloading apparatus, where this apparatus may be achieved by software and/or hardware, which may usually be integrated in a terminal. As shown in FIG. 5, the method includes:

Step 501: obtaining current usage status of at least two applications on a terminal.

Optionally, the obtaining current usage status of at least two applications on a terminal includes: obtaining usage status of the at least two applications running on the terminal at instant t, and usage status of the at least two applications running on the terminal corresponding to instants t−1 to t−n.

Where, n is a natural number greater than or equal to 2. It should be noted that, this is for example only, and other embodiments are possible.

In the embodiment of the present application, instant t may be understood as the current instant, correspondingly, the obtaining the usage status of the applications running on the terminal at instant t may be understood as obtaining the current usage status of the applications of the terminal. The obtaining the usage status of the applications running on the terminal corresponding to instant t−1 to instant t−n may be understood as obtaining the usage status of the applications running on the terminal corresponding to previous n instants of the current instant respectively. Where, the usage status of the applications includes two situations: an application that is used currently, and no application being used. If there is an application that is used currently, then the usage status is denoted as the identification information or icon information corresponding to the application that is used currently. If no application is used currently, then the usage status is denoted with the identification information representing that no application is used. It should be noted that, the usage status of the applications may also be recorded by adopting other forms.

Step 502: inputting the current usage status of the at least two applications to a pre-trained application prediction model to obtain probabilities to start the at least two applications.

Where, the pre-trained application prediction model is generated by training from an association record of usage timing of the at least two applications.

Optionally, the application prediction model is generated by training from a plurality of association record groups of usage timing, and the plurality of association record groups of usage timing are obtained by grouping the association record of usage timing of the applications in a preset time period.

In the embodiment of the present application, the usage status of the applications running on the terminal at instant t and the usage status of the applications running on the terminal corresponding to the instant t−1 to instant t−n are inputted to the pre-trained application prediction model to obtain the probabilities to start the applications outputted by the application prediction model. For example, $[APP_{t-n}, APP_{t-n+1}, \ldots, APP_{t-1}, APP_t]$ used as input vector is inputted to the pre-trained application prediction model. Where, $APP_{t-n}$ represents the application being used at instant t−n, $APP_{t-n+1}$ represents the application being used at instant t−n+1, $APP_{t-1}$ represents the application being used at instant t−1, and $APP_t$ represents the application being used at instant t (the current instant). For example, the application prediction model is generated by training the plurality of association record groups of usage timing of M applications in the preset time period. Then during the application prediction, the application prediction model outputs M+1 possibilities, where, the M+1 possibilities include M possibilities to start the applications and a possibility representing that no application is used.

Step 503: determining an application to be started according to the probabilities to start the applications, and preloading the application to be started.

In the embodiment of the present application, the application to be started corresponding to the instant t+1 is determined according to the possibilities obtained at step 502. Where, the application to be started corresponding to the t+1 instant may be understood as the application to be started at a next instant of the current instant. It can be understood that, the usage status of the applications corresponding to instant t (the current instant) and the usage status of the applications corresponding to instant t−1 to instant t−n (n instants before the current instant) are used as an input vector and are inputted to the pre-trained application prediction model to predict the usage status of the applications corresponding to instant t+1 (the next instant of the current instant). That is, a data format for predicting the usage status of the applications corresponding to the next instant through the pre-trained application prediction model is [$APP_{t-n}$, $APP_{t-n+1}$, . . . , $APP_{t-1}$, $APP_t$]→$APP_{t+1}$, where, $APP_{t+1}$ represents the usage status of the application corresponding to instant t+1 (the next instant of the current instant), that is the application being used at instant t+1.

For example, the application corresponding to a largest possibility in the possibilities obtained at step 502 is used as the application to be started. If the possibility representing that no application is used is the largest, an application corresponding to the second largest possibility is used as the application to be started. The application to be started is preloaded, so that when the user uses the application to be started, the usage efficiency and the fluency during usage are improved.

The application preloading method provided by the embodiment of the present application not only solves the technical problems of too many resources being preloaded by the applications, too many resources being occupied and power consumption becoming larger, and even the fluency of the terminal being affected, but also improves the accuracy of the prediction of the application to be started effectively, and furthermore, reduces power consumption of the terminal system and the memory usage, and optimizes the application preloading mechanism.

Figure 6:
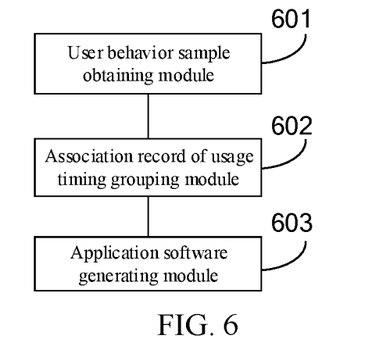
FIG. 6 is a structure diagram of an application prediction model establishing apparatus according to an embodiment of the present application.

FIG. 6 is a structure diagram of an application prediction model establishing apparatus according to an embodiment of the present application. This apparatus may be implemented by software and/or hardware, which may usually be integrated into a terminal, for example, in a serve or a mobile device, and may construct the application prediction model by performing an application prediction model establishing method. As shown in FIG. 6, the apparatus includes:

a user behavior sample obtaining module 601 configured to obtain a user behavior sample in a preset time period, where the user behavior sample includes association record of usage timing of at least two applications determined from two or more applications on the terminal, where the association record of usage timing includes a usage record of the at least two application and a usage timing relationship of the at least two applications;

an application generating module 603 configured to train a preset prediction model according to the association record of usage timing to generate an application prediction model.

Optionally, the apparatus further includes: an association record of usage timing grouping module 602 configured to group the association record of usage timing to obtain a plurality of association record groups of usage timing.

The application prediction model establishing apparatus provided by the embodiment of the present application, may take full advantage of the association record of usage timing of the applications which may truly reflect the user behavior, optimize the application preloading mechanism, and improve the accuracy of the prediction of the application to be started effectively.

Optionally, the user behavior sample obtaining module, includes:

an application sorting unit configured to sort the two or more applications according to a usage frequency of the two or more applications in the preset time period;

a target application determining unit configured to determine at least two target applications according to a sorting result;

an association record of usage timing determining unit configured to determine an association record of usage timing according to usage status of the at least two target applications as the user behavior sample.

Optionally, the association record of usage timing determining unit is configured to:

sample a usage log of the at least two target applications in accordance with a preset sampling period to determine the usage status of the target applications at a sampling instant;

associate the usage status of the at least two target applications according to the sampling instant and the usage status so as to determine the association record of usage timing.

Correspondingly, the application prediction model generating module is configured to:

train the preset prediction model according to the usage status corresponding to the sampling instant in the association record of usage timing.

Optionally, the association record of usage timing grouping module is configured to:

use an association record of usage timing of the at least two target applications corresponding to first n sampling instants as a first association record group of usage timing, use an association record of usage timing of the at least two target applications corresponding to the second to the n+1$^{th}$ sampling instants as a second association record group of usage timing, and so on, to obtain m−n+1 association record groups of usage timing, where, n is a natural number greater than or equal to 2, and m is a natural number greater than 3.

Optionally, the number of cells on the input layer of the application prediction model is determined according to a vector dimension of the association record of usage timing, and the number of cells on the output layer of the application prediction model is determined according to the number of the at least two target applications.

Optionally, an error function adopted by the application prediction model is a cross entropy loss function:

$$J = \sum_{k=1}^{C} y_k \log(\hat{y}_k);$$

Where, $y_k$ represents a standard value of the usage status of the at least two target applications, $\hat{y}_k$ represents a prediction value of the usage status of the at least two target applications, C=M+1, where M represents the number of the at least two target applications, and J represents a cross entropy of the application prediction model.

Figure 7:
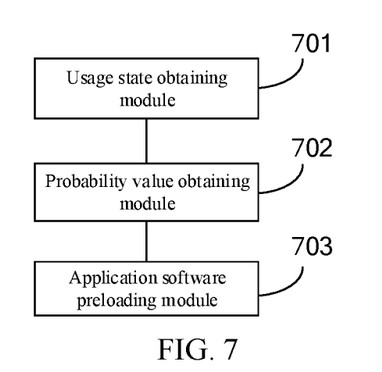
FIG. 7 is a structure diagram of an application preloading apparatus according to an embodiment of the present application.

FIG. 7 is a structure diagram of an application preloading apparatus according to an embodiment of the present application. This apparatus may be implemented by software and/or hardware, which may usually be integrated into a terminal, and may preload the application to be started by performing an application preloading method. As shown in FIG. 7, the apparatus includes:

a usage status obtaining module 701 is configured to obtain current usage status of at least two applications on a terminal;

a probability value obtaining module 702 configured to input the current usage status of the at least two applications to a pre-trained application prediction model to obtain probabilities to start the at least two applications, where the pre-trained application prediction model is generated by training from an association record of usage timing of the at least two applications;

an application preloading module 703 configured to determine an application to be started according to the probabilities to start the at least two applications, and preload the application to be started.

The application preloading apparatus provided by the present application, not only solves the technical problems of too many resources being preloaded by the applications, too many resources being occupied and power consumption becoming larger, and even the fluency of the terminal being affected, but also improves the accuracy of the prediction of the application to be started effectively, and furthermore, reduces power consumption of the terminal system and the memory usage, and optimizes the application preloading mechanism.

An embodiment of the present application further provides a storage medium including computer executable instructions. The computer executable instructions are used to execute the application prediction model establishing method when being executed by a computer processor. This method includes:

obtaining a user behavior sample in a preset time period, where the user behavior sample includes an association record of usage timing of at least two applications determined from two or more applications on a terminal, where the association record of usage timing includes a usage record of the at least two application and a usage timing relationship of the at least two applications; and training a preset prediction model according to the association record of usage timing to generate the application prediction model.

The storage medium—any kinds of memory device or storage device. The term "storage medium" intent to include: installation medium, for example, CD-ROM, floppy disk or tape device; computer system memory or random access memory, for example, DRAM, DDRRAM, SRAM, EDORAM, Rambus RAM, and the like; non-volatile memory, for example, flash memory, magnetic medium (for example, hard disk or optical storage); register or other similar type of memory component, and on the like. The storage medium may further include other types of memory or a combination thereof. In addition, the storage medium may be located in a first computer system in which the program is executed, or may be located in a different second computer system. The second computer system is coupled to the first computer system through a network, for example, the Internet. The second computer system may provide program instructions to the first computer for execution. The term "storage medium" may include two or more storage media that may reside in different locations (for example, in different computer systems connected through a network). A storage medium may store program instructions (for example, embodied as a computer program) executable by one or more processors.

Of course, in the storage medium including the computer executable instructions provided by the embodiment of the present application, the computer executable instructions thereof are not limited to the application prediction model establishing operation as described above, and may also execute related operations in the application prediction model establishing method provided by any embodiments of the present application.

An embodiment of the present application further provides another storage medium including computer executable instructions. The computer executable instructions are used to execute the application preloading method when being executed by a computer processor. This method includes:

obtaining current usage status of at least two applications;

inputting the current usage status of the at least two applications to a pre-trained application prediction model to obtain probabilities to start the at least two applications, where the pre-trained application prediction model is generated by training from an association record of usage timing of the at least two applications;

determining an application to be started according to the probabilities to start the at least two applications, and preloading the application to be started.

The specific details of computer storage medium of the embodiment of the present application are similar to the above described computer storage medium, and will be omitted herein.

Figure 8:
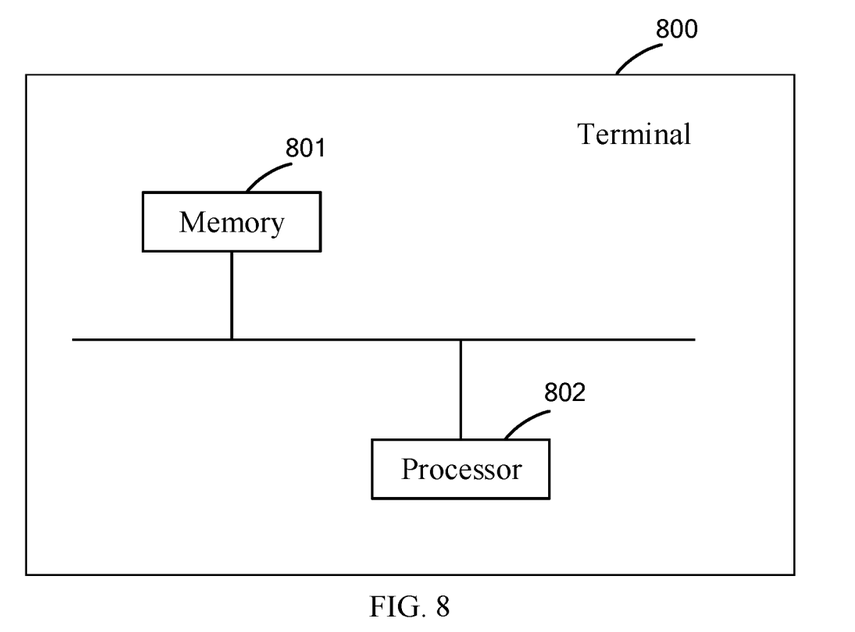
FIG. 8 is a structure diagram of a terminal according to an embodiment of the present application.

An embodiment of the present application provides a terminal. The application prediction model establishing apparatus provided by the embodiment of the present application may be integrated in the terminal. FIG. 8 is a structure diagram of the terminal according to the embodiment of the present application. As shown in FIG. 8, the terminal 800 may include: a memory 801, a processor 802 and computer programs stored on the memory and may be run in the processor, where the processor 802, when executing the computer programs, implements the application prediction model establishing method described by the embodiments of the present application.

The terminal provided by the present application may take full advantage of the association record of usage timing of the applications which may truly reflect the user behavior, optimize the application preloading mechanism, and improve the accuracy of the prediction of the application to be started effectively.

Figure 9:
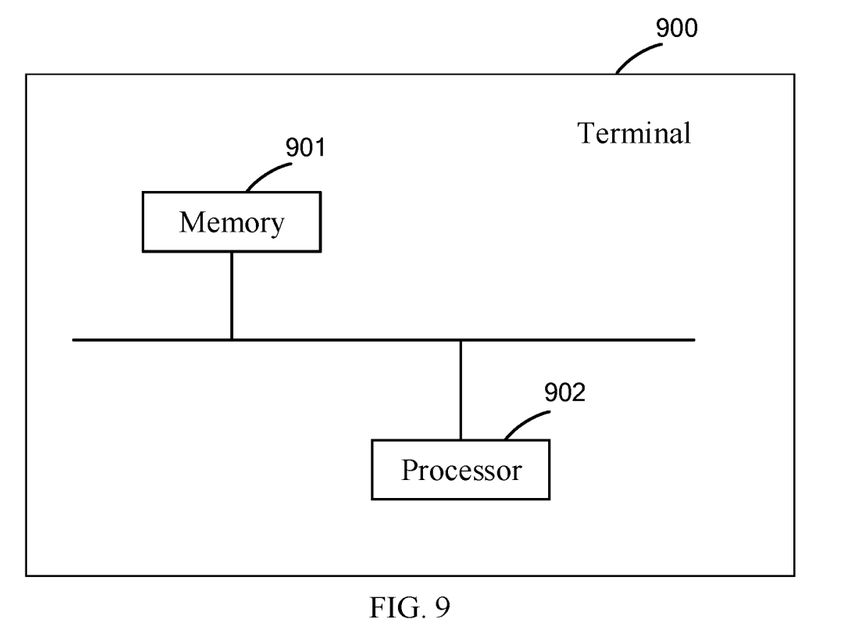
FIG. 9 is a structure diagram of another terminal according to an embodiment of the present application.

An embodiment of the present application provides another terminal. The application preloading apparatus provided by the embodiment of the present application may be integrated in the terminal. FIG. 9 is a structure diagram of the terminal according to the embodiment of the present application. As shown in FIG. 9, the terminal 900 may include: a memory 901, a processor 902 and computer programs stored on the memory and may be run in the processor, where the processor 902, when executing the computer programs, implements the application preloading method described by the embodiments of the present application.

The terminal provided by the present application, by obtaining current usage status of at least two applications on a terminal, and inputting the current usage status of the at least two applications to a pre-trained application prediction model to obtain probabilities to start the at least two applications, where the pre-trained application prediction model is generated by training from an association record of usage timing of the at least two applications, and finally determining an application to be started according to the probabilities to start the at least two applications, and preloading the application to be started, not only solves the technical problems of too many resources being preloaded by the applications, too many resources being occupied and power consumption becoming larger, and even the fluency of the terminal being affected, but also improves the accuracy of the prediction of the application to be started effectively, and furthermore, reduces power consumption of the terminal system and the memory usage, and optimizes the application preloading mechanism.

Figure 10:
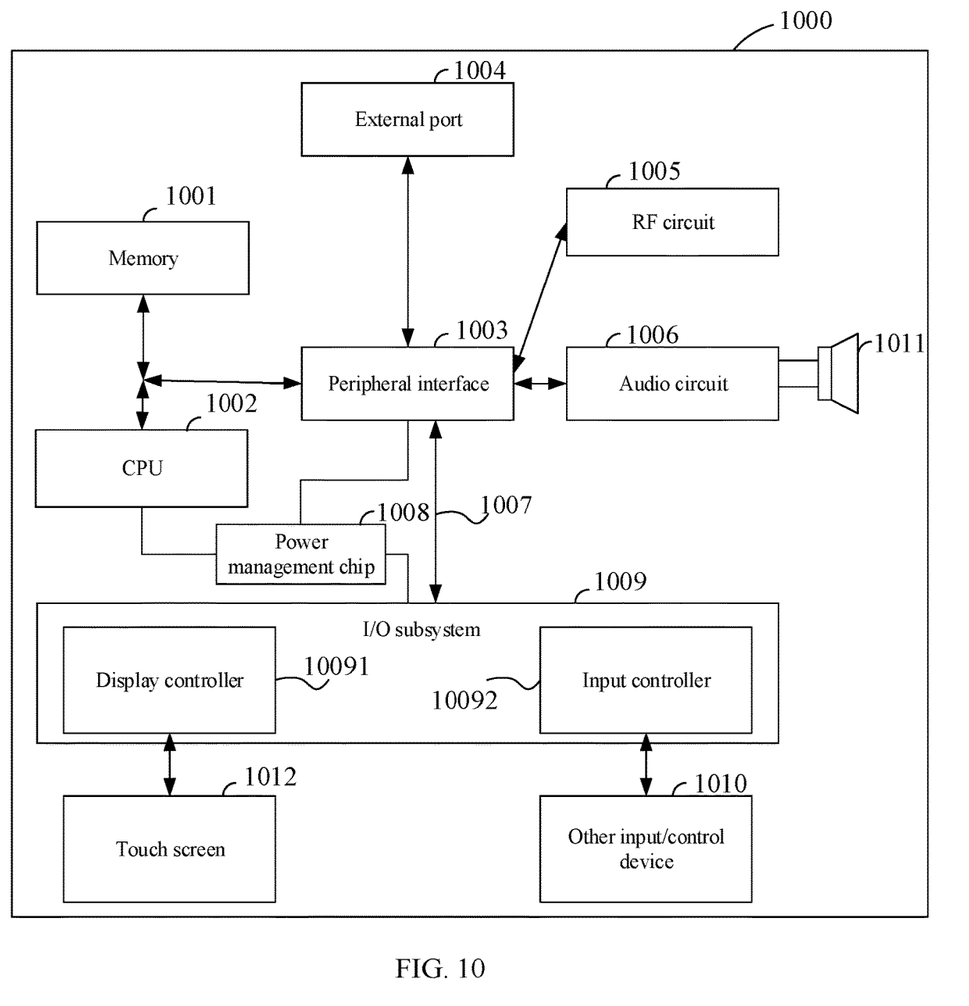
FIG. 10 is a structure diagram of still another terminal according to an embodiment of the present application.

FIG. 10 is a structure diagram of still another terminal according to an embodiment of the present application. As shown in FIG. 10, the terminal may include: a housing (not shown), a memory 1001, a central processing unit (CPU) 1002 (also known as processor, hereinafter as CPU), a circuit board (not shown) and a power circuit (not shown). The circuit board is arranged inside a space encircled by the housing. The CPU 1002 and the memory 1001 are arranged on the circuit board. The power circuit is used to provide power to each circuit or component of the terminal. The memory 1001 is used to store executable program codes. The CPU 1002 runs the computer programs corresponding to the executable program codes by reading the executable program codes stored in the memory 1001, so as to implement the following steps:

obtaining current usage status of the at least two applications on a terminal;

inputting the current usage status of the at least two applications to a pre-trained application prediction model to obtain probabilities to start the at least two applications, where, the pre-trained application prediction model is generated by training from an association record of usage timing of the at least two applications;

determining an application to be started according to the probabilities to start the at least two applications, and preloading the application to be started.

The terminal further includes: a peripheral interface 1003, an RF (Radio Frequency) circuit 1005, an audio circuit 1006, a speaker 1011, a power management chip 1008, an input/output (I/O) subsystem 1009, other input/control device 1010, touch screen 1012 and external port 1004, which communicates via one or more communication buses or a signal line 1007.

It should be understood that the illustrated terminal 1000 is merely one example of the terminal, and the terminal 1000 may have more or fewer components than those shown in the figure, may combine two or more components, or may have different component configuration. Various components shown in the figure may be implemented in hardware including one or more signal processing and/or application specific integrated circuits, software, or a combination of hardware and software.

The terminal for application preloading provided by the present embodiment is described in detail below, and the terminal takes a mobile phone as an example.

The memory 1001, the memory 1001 may be accessed by the CPU 1002, the peripheral interface 1003, and the like, and the memory 1001 may include a high speed random access memory, and may further include a nonvolatile memory, for example one or more magnetic disk storage device, flash memory device, or other volatile solid-state memory device.

The peripheral interface 1003, the peripheral interface 1003 may connect the input and output peripherals of the device to the CPU 1002 and the memory 1001.

The I/O subsystem 1009, the I/O subsystem 1009 may connect input and output peripherals on the device, for example, the touch screen 1012 and the other input/control device 1010, to the peripheral interface 1003. The I/O subsystem 1009 may include a display controller 10091 and one or more input controller 10092 for controlling the other input/control device 1010. Where, the one or more input controller 10092 receive an electrical signal from the other input/control device 1010 or transmit an electrical signal to the other input/control device 1010, and the other input/control device 1010 may include a physical button (a press button, a rocker button, and the like), a dial plate, a slide switch, a joystick, a click wheel. It is worth to be noted that the input controller 10092 may be connected to any of the following: a keyboard, an infrared port, a USB interface, and a pointing device, for example a mouse.

The touch screen 1012, the touch screen 1012 is an input interface and an output interface between the user terminal and the user, and may display a visual output to the user. The visual output may include a graphic, a text, an icon, a video, and the like.

The display controller 10091 in the I/O subsystem 1009 receives an electrical signal from the touch screen 1012 or transmits an electrical signal to the touch screen 1012. The touch screen 1012 detects the contact on the touch screen, and the display controller 10091 converts the detected contact into an interaction with a user interface object displayed on the touch screen 1012, that is, realizes human-computer interaction, and the user interface object displayed on the touch screen 1012 may be an icon for running a game, an icon for connecting to a corresponding network, and the like. It is worth to be noted that the device may also include a light mouse, which is a touch sensitive surface that does not display a visual output, or an extension of a touch sensitive surface formed by the touch screen.

The RF circuit 1005, is mainly used to establish communication between the mobile phone and the wireless network (i.e., the network side), and implement data reception and transmission between the mobile phone and the wireless network, for example, send and receive a short message, an email, and the like. Specifically, the RF circuit 1005 receives and transmits an RF signal, which is also referred to as an electromagnetic signal. The RF circuit 1005 converts an electrical signal into an electromagnetic signal or converts the electromagnetic signal into the electrical signal, and communicate with a communication network and other device through the electromagnetic signal. The RF circuit 1005 may include a known circuit for performing these functions, including but not limited to an antenna system, an RF transceiver, one or more amplifier, a tuner, one or more oscillator, a digital signal processor, a CODEC (COder-DECoder, codec) chipset, a subscriber identity module (SIM), and the like.

The audio circuit 1006, is mainly used to receive an audio data from the peripheral interface 1003, convert the audio data into an electrical signal, and transmit the electrical signal to the speaker 1011.

The speaker 1011, is configured to restore a voice signal received by the mobile phone from the wireless network through the RF circuit 1005 to a sound and play the sound to the user.

The power management chip 1008, is used to perform power supply and power management for the hardware connected to the CPU 1002, the I/O subsystem, and the peripheral interface.

The application prediction model establishing apparatus, the storage medium, and the terminal provided by the above embodiments may execute the corresponding application prediction model establishing method provided by the embodiment of the present application, and have corresponding functional modules for executing the method and beneficial effects. Regarding technical details that are not described in details in the above embodiments, reference may be made to the application prediction model establishing method provided by any embodiment of the present application.

The application preloading apparatus, the storage medium, and the terminal provided in the above embodiments may execute the corresponding application preloading method provided by the embodiment of the present application, and have corresponding functional modules for executing the method and beneficial effects. Regarding technical details that are not described in details in the above embodiments, reference may be made to the application preloading method provided by any embodiment of the present application.

Note that the above is only the preferred embodiment of the present invention and the technical principles applied thereto. Those skilled in the art will appreciate that the present invention is not limited to the specific embodiments described herein, and that various obvious modifications, changes and substitutions may be made by those skilled in the art without departing from the scope of the invention. Therefore, although the present invention has been described in detail by the above embodiments, the present invention is not limited to the above embodiments, and other equivalent embodiments may be included without departing from the inventive concept and the scope is determined by the scope of the appended claims.

What is claimed is:

1. An application prediction method, performed by a processor executing instructions stored on a memory, wherein the application prediction method comprises:
   obtaining a user behavior sample in a preset time period, wherein the user behavior sample comprises an association record of usage timing of at least two applications determined from two or more applications on a terminal, and wherein the association record of usage timing of the at least two applications comprises a usage record of the at least two applications and a usage timing relationship of the at least two applications;
   grouping the association record of usage timing of the at least two applications to obtain a plurality of association record groups of usage timing of the at least two applications; and
   training a preset prediction model according to the association record of usage timing of the at least two applications to generate an application prediction model;
   wherein the grouping the association record of usage timing of the at least two applications to obtain the plurality of association record groups of usage timing of the at least two applications comprises:
   using an association record of usage timing of the at least two applications corresponding to first n sampling instants as a first association record group of usage timing of the at least two applications, using an association record of usage timing of the at least two applications corresponding to second to $n+1^{th}$ sampling instants as a second association record group of usage timing of the at least two applications, and so on, to obtain m−n+1 association record groups of usage timing of the at least two applications, wherein n is a natural number greater than or equal to 2, and m is a total number of sampling instants and is a natural number greater than 3.

2. The application prediction method according to claim 1, wherein the obtaining the user behavior sample in the preset time period comprises:
   sorting the two or more applications according to a usage frequency of the two or more applications in the preset time period;
   determining at least two target applications according to a sorting result; and
   determining the association record of usage timing of the at least two applications according to usage status of the at least two target applications as the user behavior sample.

3. The application prediction method according to claim 2, wherein the determining the association record of usage timing of the at least two applications according to the usage status of the at least two target applications as the user behavior sample comprises:
   sampling a usage log of the at least two target applications in accordance with a preset sampling period to determine the usage status of the at least two target applications at sampling instants; and
   associating the usage status of the at least two target applications corresponding to the sampling instants and the usage status of the at least two target applications so as to determine the association record of usage timing of the at least two applications.

4. The application prediction method according to claim 3, wherein the training the preset prediction model according to the association record of usage timing of the at least two applications to generate the application prediction model comprises:
   training the preset prediction model according to the usage status of the at least two target applications corresponding to the sampling instants in the association record of usage timing of the at least two applications.

5. The application prediction method according to claim 1, further comprising:
   obtaining current usage status of the at least two applications;
   inputting the current usage status of the at least two applications to the application prediction model to obtain probabilities to start the at least two applications; and
   determining an application to be started according to the probabilities to start the at least two applications, and preloading the application to be started.

6. The application prediction method according to claim 5, wherein the current usage status of the at least two applications comprises identification information of an application being used on the terminal at a current sampling instant.

7. The application prediction method according to claim 6, wherein the current usage status of the at least two applications further comprises identification information of an application being used on the terminal corresponding to at least one previous sampling instant.

8. An application preloading method, performed by a processor executing instructions stored on a memory, wherein the application preloading method comprises:
obtaining current usage status of at least two applications on a terminal;
inputting the current usage status of the at least two applications to a pre-trained application predication model to obtain probabilities to start the at least two applications, wherein the pre-trained application prediction model is generated by training from an association record of usage timing of the at least two applications; and
determining an application to be started according to the probabilities to start the at least two applications, and preloading the application to be started;
wherein the pre-trained application prediction model is generated in following manners:
obtaining a user behavior sample in a preset time period, wherein the user behavior sample comprises the association record of usage timing of the at least two applications determined from two or more applications on a terminal, and wherein the association record of usage timing of the at least two applications comprises a usage record of the at least two applications and a usage timing relationship of the at least two applications;
grouping the association record of usage timing of the at least two applications to obtain a plurality of association record groups of usage timing of the at least two applications; and
training a preset prediction model according to the association record of usage timing of the at least two applications to generate the pre-trained application prediction model;
wherein the plurality of association record groups of usage timing of the at least two applications are obtained in following manner:
using an association record of usage timing of the at least two applications corresponding to first n sampling instants as a first association record group of usage timing of the at least two applications, using an association record of usage timing of the at least two applications corresponding to second to n+1$^{th}$ sampling instants as a second association record group of usage timing of the at least two applications, and so on, to obtain m−n+1 association record groups of usage timing of the at least two applications, wherein n is a natural number greater than or equal to 2, and m is a total number of sampling instants and is a natural number greater than 3.

9. The application preloading method according to claim 8, wherein the current usage status of the at least two applications comprises identification information of an application being used on the terminal at a current sampling instant.

10. The application preloading method according to claim 9, wherein the current usage status of the at least two applications further comprises identification information of an application being used on the terminal corresponding to at least one previous sampling instant.

11. An application preloading apparatus, comprising a processor and a memory storing instructions thereon, the processor when executing the instructions, being configured to:

obtain current usage status of at least two applications on a terminal;
input the current usage status of the at least two applications to a pre-trained application predication model to obtain probabilities to start the at least two applications, wherein the pre-trained application prediction model is generated by training from an association record of usage timing of the at least two applications; and
determine an application to be started according to the probabilities to start the at least two applications, and preload the application to be started;
wherein the processor is further configured to:
obtain a user behavior sample in a preset time period, wherein the user behavior sample comprises the association record of usage timing of the at least two applications determined from two or more applications on a terminal, and wherein the association record of usage timing of the at least two applications comprises a usage record of the at least two applications and a usage timing relationship of the at least two applications;
group the association record of usage timing of the at least two applications to obtain a plurality of association record groups of usage timing of the at least two applications; and
train a preset prediction model according to the association record of usage timing of the at least two applications to generate the pre-trained application prediction model;
wherein the processor is further configured to:
use an association record of usage timing of the at least two applications corresponding to first n sampling instants as a first association record group of usage timing of the at least two applications, use an association record of usage timing of the at least two applications corresponding to second to n+1$^{th}$ sampling instants as a second association record group of usage timing of the at least two applications, and so on, to obtain m−n+1 association record groups of usage timing of the at least two applications, wherein n is a natural number greater than or equal to 2, and m is a total number of sampling instants and is a natural number greater than 3.

12. The application preloading apparatus according to claim 11, wherein the processor is further configured to:
sort the two or more applications according to a usage frequency of the two or more applications in the preset time period;
determine at least two target applications according to a sorting result; and
determine the association record of usage timing of the at least two applications according to usage status of the at least two target applications as the user behavior sample.

13. The application preloading apparatus according to claim 12, wherein the processor is further configured to:
sample a usage log of the at least two target applications in accordance with a preset sampling period to determine the usage status of the at least two target applications at sampling instants; and
associate the usage status of the at least two target applications corresponding to the sampling instants and the usage status of the at least two target applications so as to determine the association record of usage timing of the at least two applications.

14. The application preloading apparatus according to claim 13, wherein the processor is further configured to:

train the preset prediction model according to the usage status of the at least two target applications corresponding to the sampling instants in the association record of usage timing of the at least two applications.

15. The application preloading apparatus according to claim 11, wherein the processor is further configured to:
determine a number of cells on an input layer of the pre-trained application prediction model according to a vector dimension of the association record of usage timing of the at least two applications; and
determine a number of an output layer unit number of the pre-trained application prediction model according to a number of the at least two applications.

\* \* \* \* \*